(12) United States Patent
Becka et al.

(10) Patent No.: US 10,718,423 B2
(45) Date of Patent: Jul. 21, 2020

(54) WHEEL HUB TRANSMISSION

(71) Applicant: SIEMENS AKTIENGESELLSCHAFT, München (DE)

(72) Inventors: Simon Becka, Essen (DE); Frank Keschtges, Bocholt (DE)

(73) Assignee: FLENDER GMBH, Bocholt (DE)

( * ) Notice: Subject to any disclaimer, the term of this patent is extended or adjusted under 35 U.S.C. 154(b) by 285 days.

(21) Appl. No.: 15/529,410

(22) PCT Filed: Nov. 18, 2015

(86) PCT No.: PCT/EP2015/076923
§ 371 (c)(1),
(2) Date: May 24, 2017

(87) PCT Pub. No.: WO2016/083201
PCT Pub. Date: Jun. 2, 2016

(65) Prior Publication Data
US 2018/0320777 A1    Nov. 8, 2018

(30) Foreign Application Priority Data

Nov. 25, 2014   (EP) .................................. 14194744

(51) Int. Cl.
*F16H 57/04*   (2010.01)
*B60K 17/04*   (2006.01)
*B60B 35/12*   (2006.01)

(52) U.S. Cl.
CPC ......... *F16H 57/0416* (2013.01); *B60B 35/12* (2013.01); *B60K 17/043* (2013.01)

(58) Field of Classification Search
CPC .... F16H 57/0416; B60B 35/12; B60K 17/043
USPC ......................................................... 301/6.5
See application file for complete search history.

(56) References Cited

U.S. PATENT DOCUMENTS

| | | | |
|---|---|---|---|
| 6,793,057 B1 * | 9/2004 | Smith, Jr. | ............... F16D 13/70 192/107 M |
| 8,251,674 B1 * | 8/2012 | Pairaktaridis | ............ H02K 9/06 310/62 |
| 2008/0308364 A1 | 12/2008 | Huang | |
| 2009/0032321 A1 | 2/2009 | Marsh et al. | |
| 2014/0064973 A1 | 3/2014 | Ren | |

FOREIGN PATENT DOCUMENTS

| | | | | |
|---|---|---|---|---|
| CN | 201410254904 A | * | 9/2009 | |
| CN | 101755144 A | | 6/2010 | |
| CN | 201599351 U | | 10/2010 | |
| CN | 102165211 A | * | 8/2011 | ............. F16D 65/10 |
| CN | 102165211 A | | 8/2011 | |
| CN | 103573717 A | | 2/2014 | |

(Continued)

*Primary Examiner* — S. Joseph Morano
*Assistant Examiner* — Jean W Charleston
(74) *Attorney, Agent, or Firm* — Henry M. Feiereisen LLC

(57) ABSTRACT

A wheel hub transmission includes an outer surface configured as an end face. The end face has a plurality of radially oriented cooling fins at regular spaced-apart relationship. A cover is provided to cover the cooling fins at the end face. The cover has a central opening and forms with pairs of adjacent ones of the cooling fins a plurality of radially oriented cooling ducts.

12 Claims, 3 Drawing Sheets

(56) References Cited

FOREIGN PATENT DOCUMENTS

| | | | |
|---|---|---|---|
| CN | 203562919 U | 4/2014 | |
| CN | 104139827 A | 11/2014 | |
| EP | 1 832 461 A1 | 9/2007 | |
| EP | 1832461 A1 * | 9/2007 | ........... B60K 7/0007 |
| EP | 2 168 860 A1 | 3/2010 | |
| JP | 2011/290882 A | 12/2011 | |

* cited by examiner

WHEEL HUB TRANSMISSION

CROSS-REFERENCES TO RELATED APPLICATIONS

This application is the U.S. National Stage of International Application No. PCT/EP2015/076923, filed Nov. 18, 2015, which designated the United States and has been published as International Publication No. WO 2016/083201 A1 which claims the priority of European Patent Application, Serial No. 14194744.0, filed Nov. 25, 2014, pursuant to 35 U.S.C. 119(a)-(d).

BACKGROUND OF THE INVENTION

The invention relates to a wheel hub transmission. Such transmissions are known and are sometimes also called mining truck transmissions.

Wheel hub transmissions become very warm during operation. Due to the compact design, cooling elements can only be attached to a wheel hub transmission with difficulty. As a result, under load the wheel hub transmission either becomes too warm or the wheel hub transmission is only operated under a partial load.

At present wheel hub transmissions are only cooled by means of free convection as well as windmilling and air vortexes forming because of the rotation. To enlarge the heat-dissipating surface, a surface at the end face of individual wheel hub transmissions is ribbed.

SUMMARY OF THE INVENTION

An object of the present invention is to specify a further embodiment of a wheel hub transmission, in particular, an embodiment of a wheel hub transmission which is characterized by an improved cooling effect.

According to one aspect of the present invention, this object is achieved with a wheel hub transmission including an outer surface that acts as an end face, which has radially oriented cooling fins at a regular distance from one another, and a cover which covers the cooling fins at the end face and which has a central opening, wherein the cover, along with pairs of adjacent cooling fins, defines a plurality of radially oriented cooling ducts.

The advantage of the wheel hub transmission proposed here is that the cooling ducts resulting from the attachment of the cover lead to better heat dissipation from the wheel hub transmission compared with an end face only with cooling fins. During operation, an air flow is namely produced through the cooling ducts to the outside during rotating wheel hub transmission and the resultant centrifugal force. This favors heat dissipation.

Advantageous embodiments of the invention are the subject of subclaims. The references used refer to the further embodiment of the subject matter of the main claim by the features of the respective subclaim. They are not to be interpreted as a renunciation of the achievement of independent, objective protection for the combinations of features of the referenced subclaims. Furthermore, with regard to an interpretation of the claims in a more detailed definition of a feature in a subordinate claim, it is to be assumed that there is no such a restriction in the preceding claims.

The end face is preferably in a plane which is perpendicular to a drive axle of the transmission, in particular, perpendicular to a drive axle of the transmission which in the assembled state of the transmission in a vehicle is transverse to the longitudinal axis of the vehicle. The end face is preferably on a side of the transmission facing outwards, i.e. facing away from the vehicle.

The cover which covers the cooling fins at the end face is preferably in a plane which is parallel to the plane in which the end face is located. The cover preferably lies flat against the cooling fins and preferably is also firmly attached to the cooling fins.

The cooling ducts preferably run in a star form, wherein they are oriented towards a common center. The common center preferably coincides with the central opening of the cover.

Cooling air which subsequently flows through the radially oriented cooling ducts can flow in from outside through the central opening of the cover.

An embodiment of the wheel hub transmission is characterized by a drive axle extended beyond the end face, wherein a radial fan with air flow towards the surrounding cooling ducts is attached to the extended drive axle. During operation, the radial fan is set in rotation by the drive axle. The radial fan therefore rotates at the rotational speed of the drive axle and thus at a significantly higher rotational speed than the wheel hub housing and its front surface. The rotating radial fan accelerates the respectively captured air particles and under the influence of centrifugal force these reach the cooling ducts connecting in a radial direction to the individual fan blades of the radial fan. This produces an air flow through the cooling ducts, and what is more, a significantly increased air-mass flow compared to an embodiment without radial fans, when the air flow is only produced as a result of the rotation of the wheel hub housing and the front surface. The increased air-mass flow leads to significantly improved heat dissipation from the wheel hub transmission once again.

The end face is preferably in a plane which runs vertically to that of the extended drive axle supporting the radial fans.

In a particular embodiment of the wheel hub transmission with a radial fan, a radial fan independent of the direction of rotation, in other words a radial fan with fan blades not adjusted in an axial direction, is used. The independence of the direction of rotation of the radial fan ensures that the air-mass flow effective for heat dissipation occurs independently of the direction of rotation of the drive axle and thus independently of the direction of travel of a respective vehicle with such a wheel hub transmission.

In a further embodiment of the wheel hub transmission, the cooling fins are of different lengths in a radial direction, resulting in at least long cooling fins and, in relation to the long cooling fins, short cooling fins. The radially oriented long and short cooling fins are distributed evenly along the periphery of the front surface. The sequence of longer and shorter cooling fins is such that a long cooling fin is followed by a number of short cooling fins, that is to say, for example, a short cooling fin, two short cooling fins, three short cooling fins and so on, and then a long cooling fin again in a regular sequence in a peripheral direction. The area effective for heat dissipation is increased by a high number of cooling fins. Only long cooling fins, however, would result in relatively narrow inflowing openings of the cooling ducts defined by two cooling fins respectively and the cover. The advantage of the arrangement outlined above and the alternating sequence is therefore that the area effective for heat dissipation, namely the total of the lateral surfaces of the long and short cooling fins, is increased without the inflowing openings becoming too small. In each case this results in an opening between two long cooling fins leading to at least two cooling ducts and therefore correspondingly wide.

A particular embodiment of a wheel hub transmission with such an alternating sequence of long and short cooling fins provides that a long cooling fin is followed by a short cooling fin and then a long cooling fin again in a regular sequence in a peripheral direction. In each case, this leaves a sufficiently large inflowing opening for two adjacent cooling ducts separated from each other by a short cooling fin. On the other side, a very large surface effective for heat dissipation is also produced by the high number of long cooling fins.

In yet another embodiment of a wheel hub transmission as described here and hereinafter, the cover has a conically stepped structure originating from the central opening. The height of the cover decreases with the conical gradation from inside to outside, the lowest height being produced in the region of the cooling fins. The height of the cover in the central section permits the attachment of a radial fan with sufficiently high fan blades in an axial direction. The height of the fan blades greatly influences the moved amount of air pressed into the cooling ducts and therefore the heat dissipation achievable as well. The lower height in the peripheral region, that is to say, above the cooling fins, leads to a compact design, wherein the lower height results in an increase in the flow speed through the cooling ducts. Quantitatively, the increased flow speed leads to effectively even heat dissipation, as would be produced with a flat cover and correspondingly higher cooling fins, in other words, an enlarged area of the cooling ducts. The compact design resulting from the conically stepped cover therefore does not have a negative effect on the heat dissipation achievable.

Wheel hub transmissions in the manner described here and hereinafter come into question for use in vehicles. Accordingly, the invention is also a vehicle, for example, a heavy goods vehicle, in particular, a heavy goods vehicle in the form of a so-called mining truck, with at least one such wheel hub transmission, usually one wheel hub transmission respectively for each wheel.

BRIEF DESCRIPTION OF THE DRAWINGS

An exemplary embodiment of the invention is explained in more detail hereinafter with reference to the diagram. Corresponding objects or elements have the same reference characters in all the figures, in which.

DETAILED DESCRIPTION OF THE EMBODIMENTS

Figure 1:
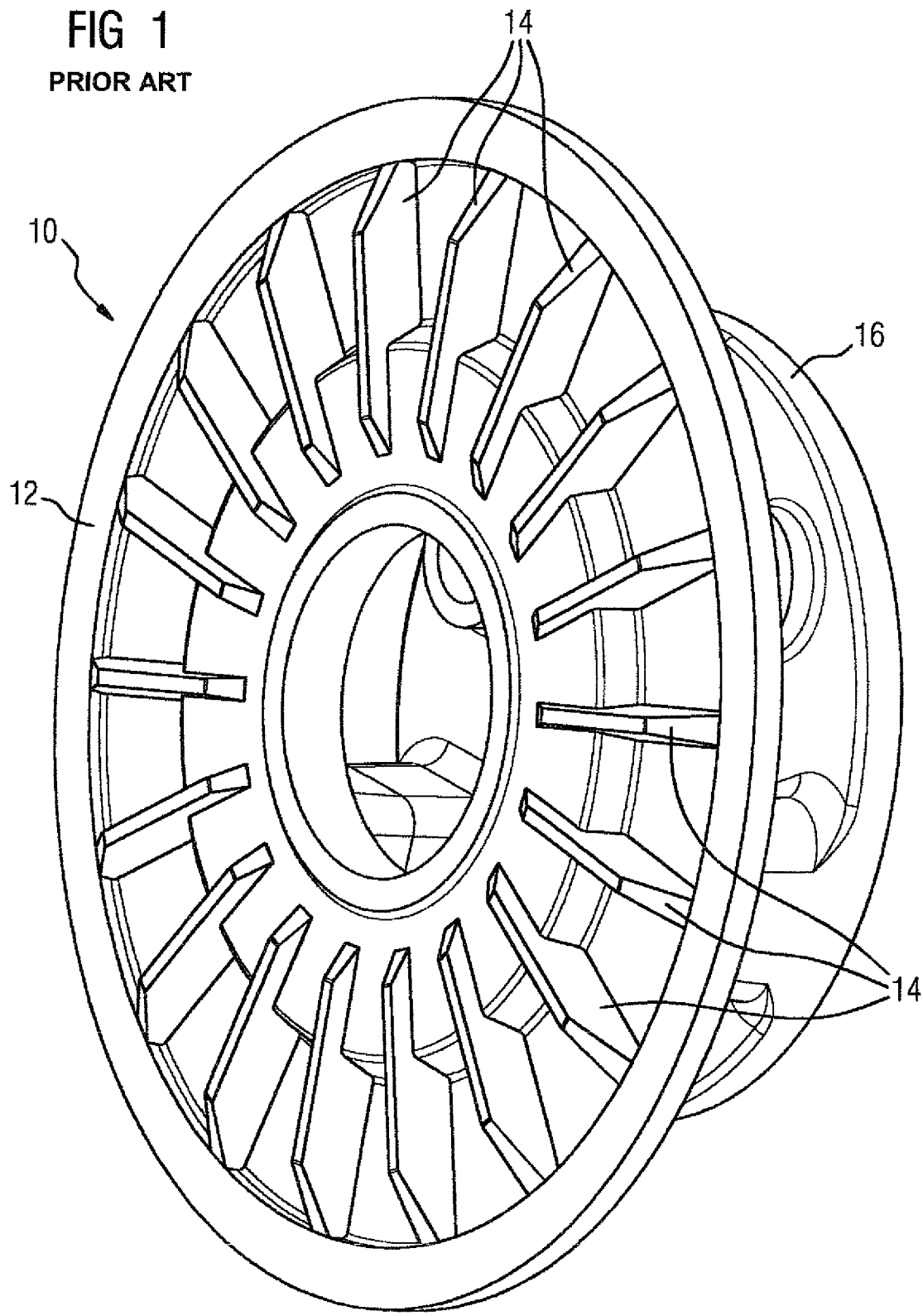
FIG. 1 shows a known wheel hub transmission with a ribbed front surface.

FIG. 1 shows an isometric view of a section of the housing of a wheel hub transmission 10. In the viewing direction chosen for the diagram, essentially an end face 12 of the housing of the wheel hub transmission 10 is shown. On the end face 12 there are—as a previous measure for better cooling of the wheel hub transmission 10—radially oriented fins at a regular distance from one another and acting as cooling fins 14. These enlarge the heat-dissipating surface of the wheel hub transmission 10 and accordingly lead to better cooling compared to cooling with a flat end face 12. In the background, another component 16 is visible on the transmission end face. The interior of the wheel hub transmission 10 is not shown.

Figure 2:
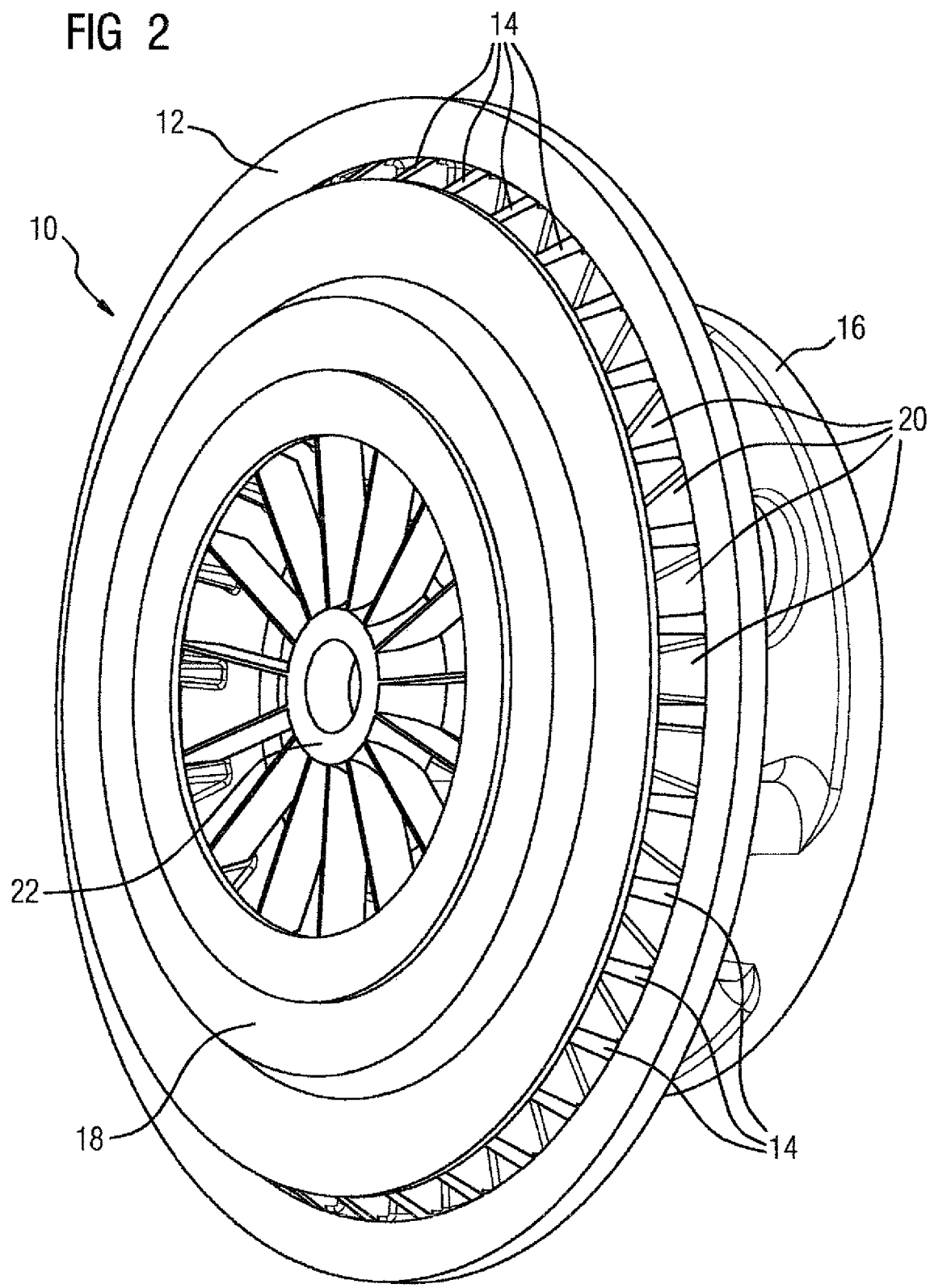
FIG. 2 shows a wheel hub transmission in the manner proposed here.

FIG. 2 shows an embodiment of the wheel hub transmission 10 proposed here based on the section of the wheel hub transmission 10 shown in FIG. 1. Unlike the situation in FIG. 1, the proposed wheel hub transmission 10 and its housing have a cover 18 with a central opening on the end face 12. The cover 18 and the cooling fins 14 define a multiplicity of cooling ducts 20. During operation and rotating wheel hub transmission 10, an air flow is produced through the cooling ducts 20 due to the centrifugal force then effective. This air flow leads to better heat dissipation compared to the cooling effect of the previous embodiment with only cooling fins 14 because owing to the centrifugal force, an essentially constant air-mass flow is produced through the cooling ducts 20, supplying the heat-emitting surfaces uniformly with air.

To supply additional air to cool the wheel hub transmission 10 through the cooling ducts 20, a drive shaft (not shown) of the wheel hub transmission 10 is routed to the exterior as far as the region of the cover 18 and there attached to a radial fan 22, in particular, a radial fan independent of the direction of rotation 22. The radial fan 22 is located above the central opening in the cover 18 in contact with the ambient air, draws in ambient air and forces this through the cooling ducts 20. The resultant increased air-mass flow through the cooling ducts 20 leads to improved heat dissipation from the wheel hub transmission 10. The drive shaft extended to drive the radial fan 22 may also be journaled in the extended section. Furthermore, or alternatively, an additional seal is optionally provided in the extended section.

Another feature of the embodiment of the wheel hub transmission 10 shown in FIG. 2 is that not all the cooling fins 14 are the same length in a radial direction. This is reflected, for example, by means of the number of cooling fin ends visible on the outer edge of the cover 18 and the cooling fin ends visible through the central opening in the cover 18. In the embodiment shown, the long and short cooling fins 14 are arranged in an alternating sequence such that, in a peripheral direction, a long cooling fin 14 is followed by a short cooling fin 14 and then a long cooling fin 14 again (only the ends of the long cooling fins 14 are visible through the central opening in the cover 18). This alternating sequence results in a sufficiently large opening for incoming air being produced in a radial direction between each two long cooling fins 14. Although the constant use of long cooling fins 14 would enlarge the surface of the cooling ducts 20, it would greatly restrict the air-mass flow actually entering the cooling ducts 20 due to the small opening width of the cooling ducts 20 on the inflowing side. An alternating sequence of long and short cooling fins 14 is a favorable compromise between the amount of air flowing into the cooling ducts 20 on the one hand and the inner surface of the cooling ducts 20 on the other hand.

The modifications described, namely the cover 18, the cooling ducts 20 and the radial fan 22 resulting from the cover 18, come into question for use with any wheel hub transmissions 10 and are therefore expressly not restricted to the embodiment of the wheel hub transmission 10 shown.

Tests and simulations of the embodiment of the wheel hub transmission 10 with cooling ducts 20 and a radial fan 22 described here have resulted in more than three times the amount of heat dissipation compared to heat dissipation based solely on convection (FIG. 1).

Figure 3:
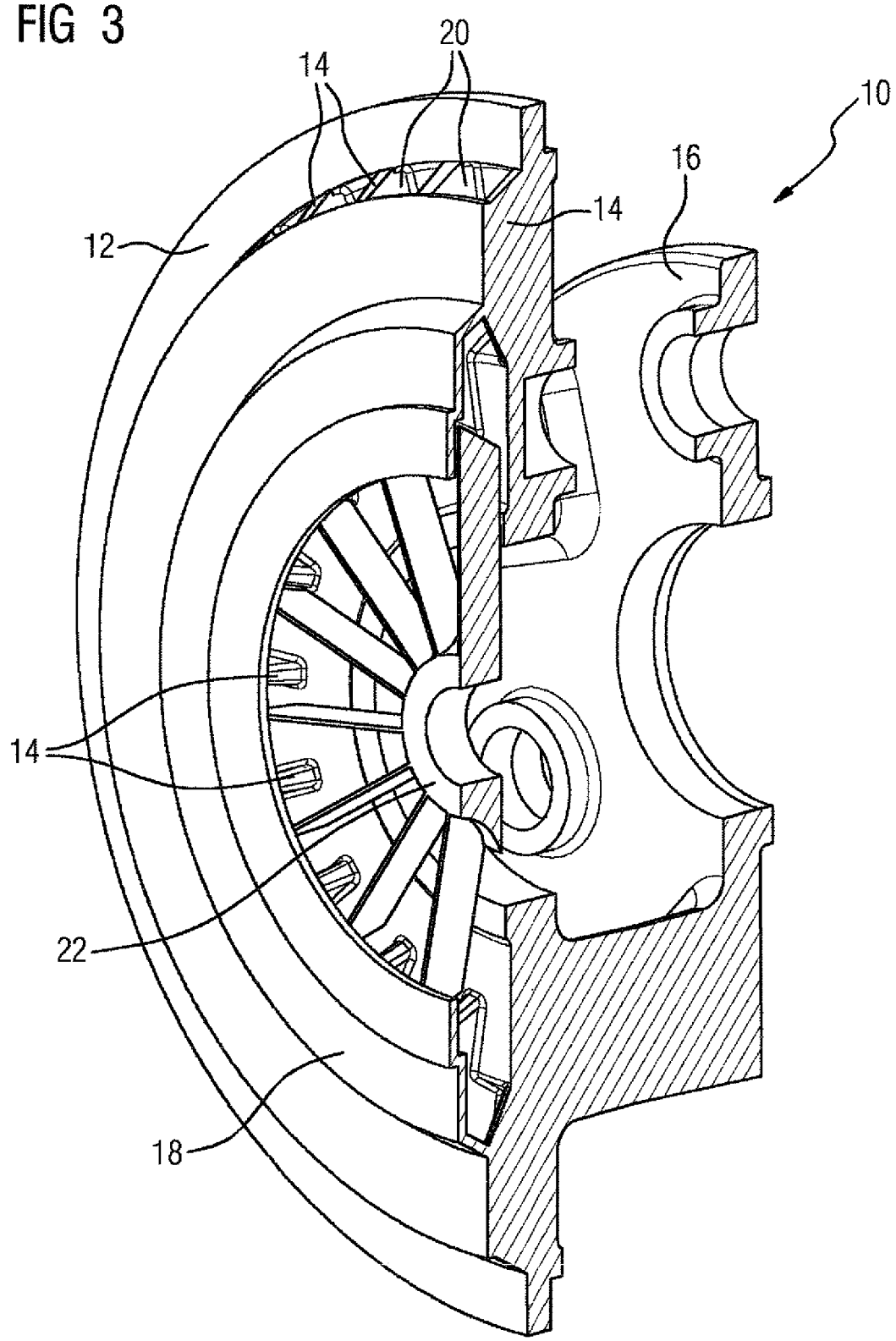
FIG. 3 shows a section through the wheel hub transmission from FIG. 2.

FIG. 3 shows a sectional view of the wheel hub transmission 10 according to FIG. 2. In the embodiment shown, a conically stepped structure of the cover 18, the fan blades of the radial fan 22 and the cooling fins 14 laterally delimiting the cooling ducts 20 are visible. The conically stepped structure of the cover 18 defines a central space sufficiently large to accommodate the radial fan 22, the free height of which decreases in a radial direction, resulting in ambient air drawn in by the radial fan 22 being pressed through the cooling ducts 20 with increased speed. The increased speed and the resultant increased air-mass flow lead to good heat dissipation of the surface 12 at the end face of the wheel hub transmission 10 and thus of the overall wheel hub transmission 10.

Although the invention was illustrated and described in more detail by the exemplary embodiment, the invention is not limited by the disclosed example or examples and other variations can be derived from it by a person skilled in the art without departing from the scope of the invention.

Individual aspects of the description presented here can be briefly summarized as follows: specified is a wheel hub transmission 10 comprising an outer surface that acts as an end face 12, wherein the end face 12 has radially oriented cooling fins 14 at a regular distance from one another, wherein the wheel hub transmission 10 is characterized by a cover 18 which covers the cooling fins 14 at the end face and which has a central opening and wherein the cover 18, along with pairs of adjacent cooling fins 14, defines a multiplicity of radially oriented cooling ducts 20 through which intake air flows through the central opening during operation and effects a cooling or heat dissipation of the surface of the wheel hub transmission 10 and thus of the overall wheel hub transmission 10.

What is claimed is:

1. A wheel hub transmission, comprising:
   an outer surface configured as an end face, said end face having a plurality of radially oriented cooling fins at regular spaced-apart relationship; and
   a cover configured to cover the cooling fins at the end face while leaving the end face exposed, said cover having a central opening and forming with pairs of adjacent ones of the cooling fins a plurality of radially oriented cooling ducts,
   wherein the end face is oriented on a side of the wheel hub transmission facing outwards,
   wherein the cover lies flat against the cooling fins and is firmly attached to the cooling fins.

2. The wheel hub transmission of claim 1, further comprising a radial fan for directing air flow into the surrounding cooling ducts, said radial fan being attached to a drive axle sized to extend beyond the end face.

3. The wheel hub transmission of claim 2, wherein the radial fan is configured independent of a direction of rotation.

4. The wheel hub transmission of claim 1, wherein the cooling fins have different lengths in a radial direction to define long cooling fins and short cooling fins arranged such that in regular sequence in peripheral direction a long cooling fin is followed by a number of short cooling fins followed again by a long cooling fin.

5. The wheel hub transmission of claim 1, wherein the cooling fins have different lengths in a radial direction to define long cooling fins and short cooling fins arranged such that in regular sequence in peripheral direction a long cooling fin is followed by a short cooling fin followed again by a long cooling fin.

6. The wheel hub of claim 1, wherein the cover extends conically into the central opening and decreases in height from a center in a direction towards the cooling fins.

7. A vehicle, comprising a wheel hub transmission, said wheel hub transmission including an outer surface configured as an end face, said end face having a plurality of radially oriented cooling fins at regular spaced-apart relationship, and a cover configured to cover the cooling fins at the end face while leaving the end face exposed, said cover having a central opening and forming with pairs of adjacent ones of the cooling fins a plurality of radially oriented cooling ducts, wherein the end face is oriented on a side of the wheel hub transmission facing outwards away from the vehicle, wherein the cover lies flat against the cooling fins and is firmly attached to the cooling fins.

8. The vehicle of claim 7, wherein the wheel hub transmission further includes a radial fan for directing air flow into the surrounding cooling ducts, said radial fan being attached to a drive axle sized to extend beyond the end face.

9. The vehicle of claim 8, wherein the radial fan is configured in the wheel hub transmission independent of a direction of rotation.

10. The vehicle of claim 7, wherein the cooling fins have different lengths in a radial direction to define long cooling fins and short cooling fins arranged such that in regular sequence in peripheral direction a long cooling fin is followed by a number of short cooling fins followed again by a long cooling fin.

11. The vehicle of claim 10, wherein the cooling fins have different lengths in a radial direction to define long cooling fins and short cooling fins arranged such that in regular sequence in peripheral direction a long cooling fin is followed by a short cooling fin followed again by a long cooling fin.

12. The vehicle of claim 7, wherein the cover extends conically into the central opening and decreases in height from a center in a direction towards the cooling fins.

* * * * *